July 13, 1954  C. M. GREEN, JR  2,683,359
ICE-MAKING METHOD AND APPARATUS
Filed Aug. 25, 1950  3 Sheets-Sheet 1
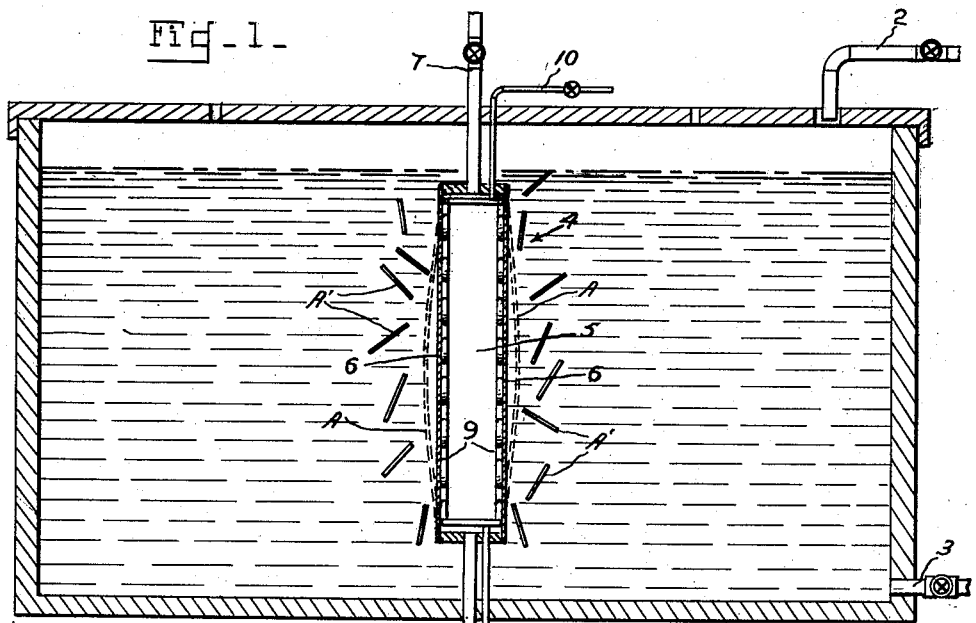
Fig-1-
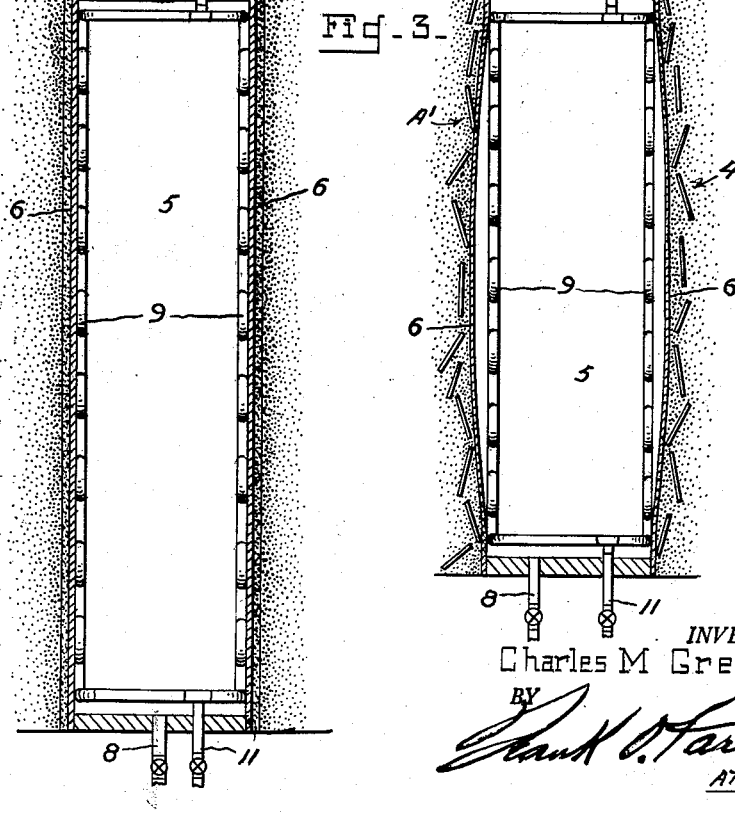
Fig-2-  Fig-3-
INVENTOR.
Charles M Green, Jr.
BY
Frank O. Parker
ATTY July 13, 1954  C. M. GREEN, JR  2,683,359
ICE-MAKING METHOD AND APPARATUS
Filed Aug. 25, 1950  3 Sheets-Sheet 2
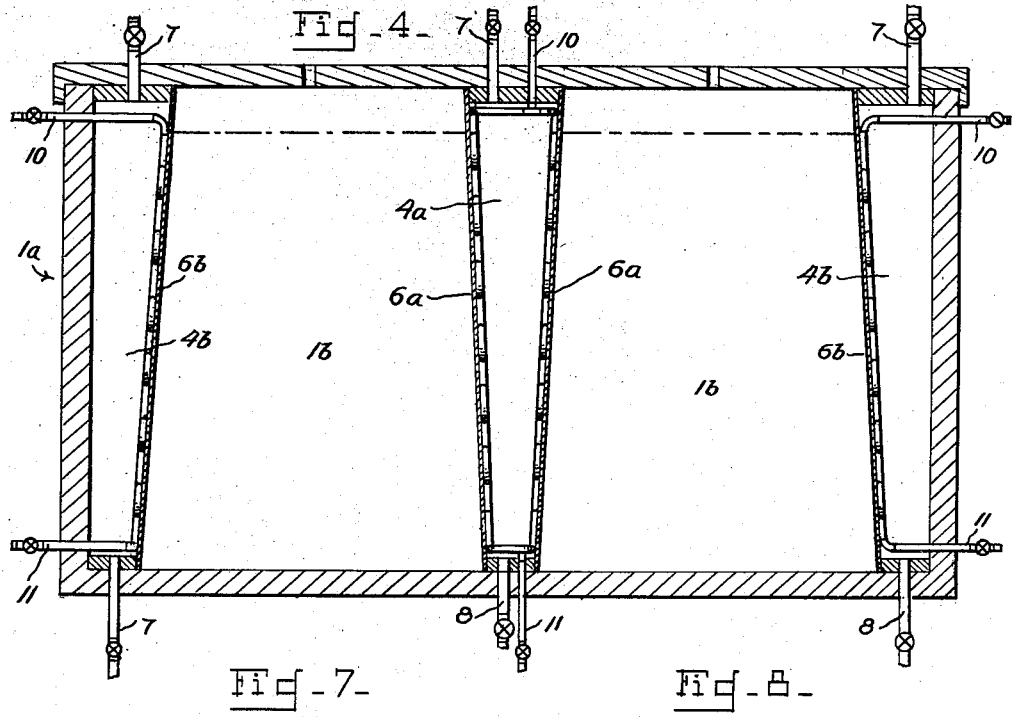
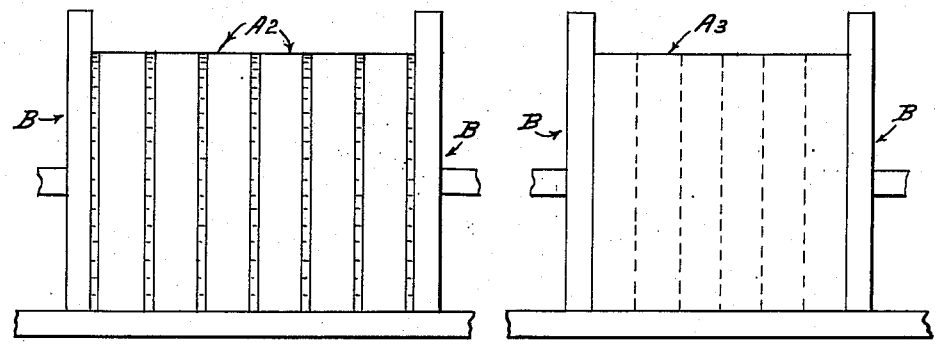
INVENTOR.
Charles M Green, Jr.
BY
ATTY.

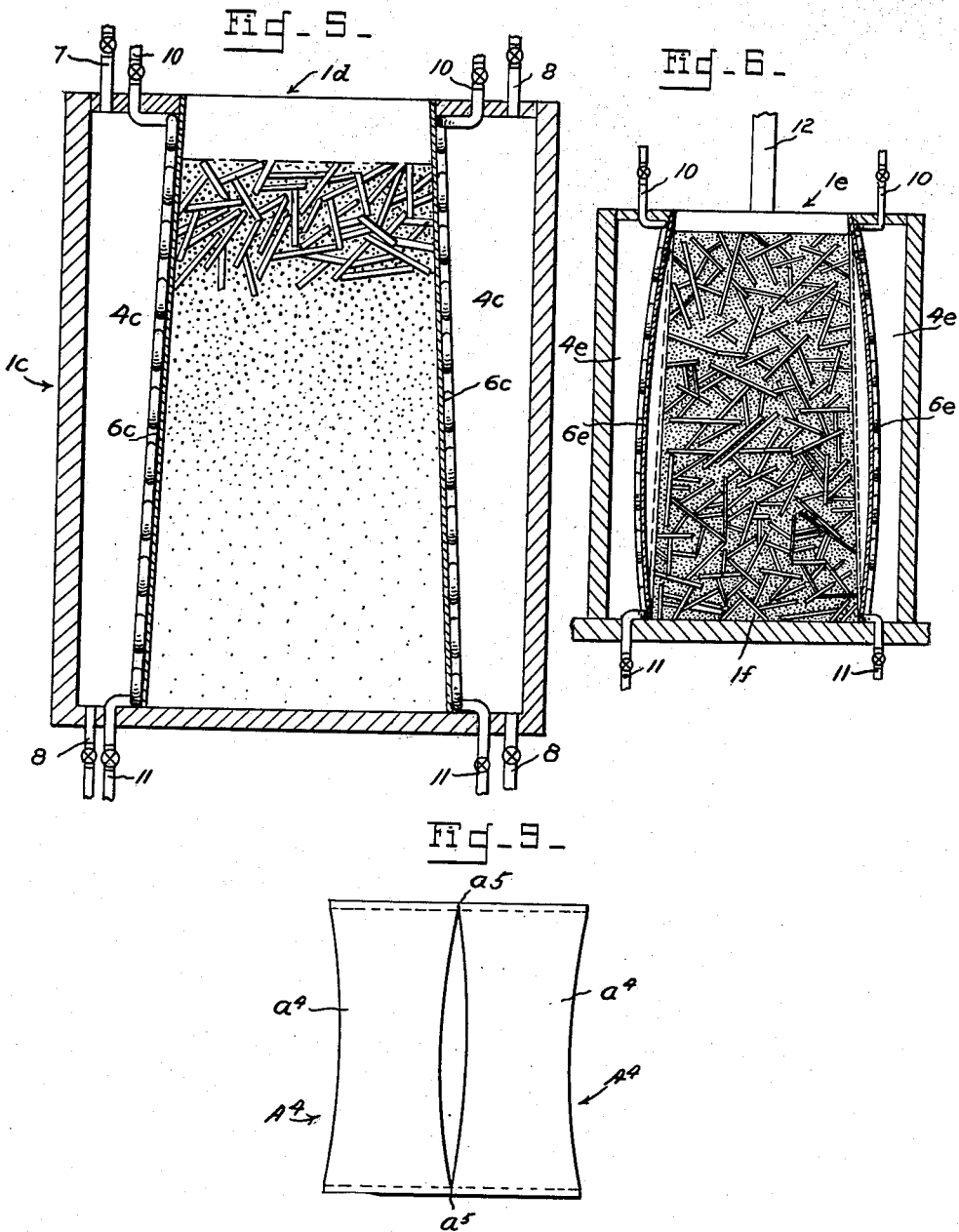

Patented July 13, 1954

2,683,359

UNITED STATES PATENT OFFICE 2,683,359

ICE-MAKING METHOD AND APPARATUS

Charles M. Green, Jr., Pensacola, Fla., assignor to Francis Wm. Taylor, Pensacola, Fla.

Application August 25, 1950, Serial No. 181,439

8 Claims. (Cl. 62—114)

My invention relates to a method of and apparatus for automatically and continuously freezing ice and other comestibles in containers in which are deformable refrigerated plates having surfaces against which the comestibles are congealed and from which thin sheets of ice as formed are separated and broken into fragments by deformation of the plates, which fragments are collected and caused to cohere together to form a composite block of ice. My invention also relates to a method and apparatus of this character for freezing $H_2O$ and other comestible liquids into blocks in which soluble edible substances dissolved in the liquid, or other edible substances or modifying substances dispersed in the liquid, are concentrated in small units of ice and then evenly distributed throughout a composite block formed of a multiplicity of such small units of ice which are coherently united or fritted or fused together.

The principal object of my present invention is the provision of a novel method and apparatus for producing ice in large quantity at low cost and with great speed.

A further object of my invention is the provision of a method and apparatus for rapidly producing large composite blocks of ice, each comprising a plurality of relatively smaller composite pieces or blocks of ice tightly cohered one to another.

A still further object of the invention is the provision of a method and apparatus for producing a composite block of ice containing soluble or other edible substances relatively evenly distributed through the block.

A still further object of the invention is the provision of a method and apparatus for producing blocks of ice having concaved surfaces for abutting engagement when stacked in cold storage, thus reducing the areas of their surfaces tending to adhere lightly together and facilitating their separation from each other.

A still further object of the invention is the production of a composite block of ice formed of matted particles or relatively small pieces of ice fritted or fused together.

A still further object of the invention is to provide types of apparatus for producing one or more blocks at a time within a single liquid container.

A still further object of the invention is the production of several new and useful frozen articles of commerce.

Artificial ice has been produced in the United States for many years by a variety of methods which have included freezing ice in tapered cans submerged in a secondary refrigerant, such as sodium chloride brine, immersing refrigerating plates in water and causing ice to form upon the plates, compressing numerous fragments of ice into cakes (e. g., "pakice" and "flakice"), and cohering several relatively thin sheets of ice by pouring water between them and then holding them at sub-freezing temperatures until they have cohered solidly together.

Attempts have also been made to produce blocks of so-called eutectic ice, or of ice containing one or more added soluble or comminuted solid comestible substances, but such efforts have, from a commercial point of view, been uniformly unsuccessful, because there is a natural tendency for such substances to separate out of the solution being frozen, this tendency causing the solutes or other substances to be concentrated near the center of the frozen blocks rather than being evenly distributed therethrough.

My invention overcomes all over the objections inherent in the above and other older methods of ice production, whereby I am able to produce large composite cakes of ice of both substantially pure $H_2O$ and of $H_2O$ containing various solutes or other edible substances, and also to produce such cakes very rapidly and with the solutes or edible substances relatively evenly distributed throughout the cakes.

In one form, the method of my invention consists in submerging in the liquid to be frozen a deformable refrigerated plate, congealing a thin layer of the liquid against a surface of said plate, deforming the plate to break up the congealed sheet and to free it from the plate, and then repeating the freezing and deforming steps until the desired amount of congealed liquid has been produced. This method produces ice very much more rapidly than would be possible if the total desired amount of liquid were congealed against a plate in an undisturbed layer of the desired thickness.

Another phase of my invention consists in collecting the ice fragments produced by fracturing the formed ice sheets and causing them to cohere or to be fritted or fused together in matted formation to provide an ice block in which any solutes or particles of edible substances will be contained in and between the cohering matted fragments so as to be uniformly distributed throughout the block.

Still another phase of my invention consists in submerging a plurality of deformable refrigerating plates oppositely disposed in approximately parallel relationship in a liquid-containing tank, and then congealing substantially all the liquid in the tank by repeatedly freezing the liquid to and freeing it from the surfaces of the refrigerated plates. It is obvious that if all of a liquid containing one or more dissolved substances is frozen in a tank by this process, the solutes will be unevenly concentrated through each of the several layers of ice, the concentration being greatest on the surface of the sheet in contact with the refrigerated surface and least at the opposite surface of the ice sheet, because the speed of freezing of each sheet will decrease as its thickness increases and because the slower the freezing the smaller the amount of solute will be included in the sheet, that each successive sheet will contain a higher average concentration of the solute or solutes because some solute will be driven out of each amount of liquid frozen, and that all the solutes will have been thus incorporated in the ice when all of the liquid has been congealed, but that at the end of the operation the solute material will be substantially evenly distributed throughout the finished cake of congealed liquid because each successive sheet will have been fragmented and its particles distributed throughout the final block of congealed material.

Still another phase of my method consists in producing numerous relatively thin cakes of ice, supercooling the cakes well below the freezing point of pure water, wetting the surfaces of the cakes with substantially pure water or some other liquid having a freezing point lower than the temperature of the cakes, and then pressing several such cakes together with opposite parallel surfaces in juxtaposition until the liquid with which the surfaces were wetted have congealed and cohered the several cakes into a solid block.

The novel method herein disclosed of freezing comestible liquids or liquids containing comestible substances enables me to produce plain ice, or various kinds of frozen beverages or other products in a rapid manner and at low cost.

In the accompanying drawings I have shown certain exemplificative means for carrying my invention into practical effect, such means being largely diagrammatically shown, and with the understanding that the invention is not restricted thereto, as conceivably various other forms of means might be used for the purpose, and in these drawings:

Figure 1 is a vertical sectional view of one form of apparatus for producing ice sheets and cakes in accordance with my invention.

Figure 2 is a sectional view on an enlarged scale of the refrigerative chambers of Fig. 1, showing on one of the freezing plates the manner in which an ice sheet from liquid containing a solute is formed thereon, the degree of density of the shading representing the relative concentration of the solute throughout and on the sheet.

Figure 3 is a view similar to Fig. 2 showing direction of deformation of the freezing plates and the manner in which the ice sheets are broken up thereby.

Figure 4 is a vertical section through another form of apparatus in which two composite ice cakes may be simultaneously produced.

Figure 5 is a vertical section through still another form of apparatus for making a single large composite ice cake, showing the manner in which the sheet fragments float to the surface of the liquid at the top of the liquid tank for congellation into block form.

Figure 6 is a similar view of still another form of apparatus showing a completely formed composite ice cake and also showing the use of means for limiting the upward movement of the ice fragments and discharging the ice cake.

Figure 7 is a diagrammatic illustration of a press, showing the manner in which a number of relatively thin ice cakes may be combined to form a larger unitary block or cake.

Figure 8 is a similar view showing the unitary block or cake formed by the cohering thinner cakes.

Figure 9 is a view of two ice cakes or blocks each having two opposite concaved surfaces for abutting engagement with an adjacent block and designed to facilitate separation of blocks adhering to each other when stacked in cold storage.

Referring now more particularly to the form of my invention shown in Fig. 1, 1 represents a suitably insulated tank or mold chamber designed to be substantially filled with a comestible liquid to be formed into ice, which liquid may be pure water ($H_2O$), or water containing edible solubles or comminuted edible solids dispersed through it, or fruit juice, or any comestible liquid combined or not with other substances and capable of being frozen into composite ice cakes or blocks. This liquid may be supplied to the tank through inlet means 2 and withdrawn from the tanks when required through outlet means 3. Such inlet and outlet means may lead from and to a main reservoir source of supply of the liquid and form therewith circulating means whereby the tank 1 may be replenished with the liquid whenever necessary and any surplus or unused liquid withdrawn therefrom and conducted back to the source of supply.

Arranged within the tank 1, preferably centrally thereof, is a vertically disposed refrigerating chamber 4 comprising a hollow body 5, of circular, rectangular or other suitable form, and having a pair of oppositely disposed flexible walls 6 in the form of freezing plates, whose inner surfaces face toward the interior of the chamber and whose outer surfaces are submerged in the liquid contained in the tank. These walls or freezing plates are made of relatively thin material, preferably resilient sheet metal, and may be of curved or flat formation. As shown in Fig. 1, the plates are flat and secured at their peripheries to the chamber body 5, but are otherwise free for flexion, so that they may be deformed i. e., bowed outwardly or inwardly from a normally flat condition into concavo-convex form, through variations of pressure as existing between the pressure of the liquid in the tank 1 and any relative increase or reduction of pressure in the chamber 4.

The chamber 4 is hermetically sealed and normally filled with a pressure fluid or liquid, which may be calcium chloride solution or other suitable solution, liquid, gas or air. This fluid or solution may be supplied to the chamber through a valved pipe 7 at its top and withdrawn from the chamber through a valved pipe 8 at its bottom. The pipes 7 and 8 are, in practice, preferably arranged in a circuit including a pressure or exhaust pump or other suitable means whereby the liquid or fluid in the chamber 4 may be either placed under pressure to deform the plates 6 outwardly or said fluid withdrawn to form a partial vacuum in the chamber 4 to cause the plates 6 to be deformed inwardly under the pressure of the liquid in the tank 1. The pressure producing or vacuumizing pump or other means employed may be continuously operated at such a speed or speeds as to cause a pressure varying action to be produced at certain intervals equalizing those required to form sheets of ice of a desired thickness on the outer surfaces of the plates 6, as hereinafter described. Normally the pressure in the chamber 4 acting on the inner surfaces of the plates 6 is equal to the pressure of the liquid in the tank 1 acting on the outer surfaces of the plates, but when these pressures are relatively varied, by either increasing or reducing the pressure in the chamber 4, the plates 6 will be bowed or deformed either outwardly or inwardly, according to whether the pressure in the chamber 4 is increased or reduced. The plates may be made to operate either way as may be found to be most desirable or efficient in freezing different kinds of liquids.

A material and important advantage gained by either of these ways of deforming the plates over any mechanical means used for the purpose is that by employing elastic pressure to deform the plates a more uniform deformation of the plates is secured to ensure fractionation of the ice sheets over the entire areas of the plates.

The plates 6 may be refrigerated by any suitable refrigerating means. In the present instance, refrigerating coils 9 are arranged in the chamber adjacent to or in contact with the inner surfaces of the plates. These coils are connected with inlet and outlet pipes 10 and 11 serving as the expansion and heat-laden vapor return pipes of a refrigerating system using anhydrous ammonia, Freon or any other primary or secondary refrigerating medium which is circulated in the usual manner through the coils and other parts of the system. The coils keep the plates 6 refrigerated to the proper degree to cause rapid freezing of the liquid on their outer surfaces.

In carrying out the method with the apparatus shown in Fig. 1, sheets A of ice are caused to be formed from the liquid in tank 1 on the outer surfaces of the plates 6. When sheets of the intended thickness are so formed, which sheets are comparatively thin, the pressure producing means automatically operates to deform the plates 6 in the intended direction which may be outwardly, as shown in dotted lines, after which the pressure is removed to permit the plates to return to normal position. As a result of the deformation of the plates the ice sheets are separated from the plates and broken into relatively small fragments A¹.

These fragments float to the top of the liquids in tank 1 and commingle at all angles together. This freezing of the liquid in tank 1 on the plates 6 and the fractionation of the formed ice sheets continues and is repeated at frequent intervals until all the liquid in the tank is congealed into sheets and the sheets broken into fragments which are caused to cohere to form a cake or block of ice which is solidified to the desired degree. As the fragments of ice are formed and come together in the progressive freezing and commingling actions the ice particles or fragments are brought to lie in matted relation throughout the mass, adjoining fragments being united by coherent frozen portions of the liquid is reduced to freezing point and below.

As hereinbefore described in the process of producing successive ice sheets, the solutes or other edible substances in the liquid will be uniformly distributed throughout the composite block when formed. This is generally the case, but if any portions of the solutes or edible particles are not directly frozen in the sheets they will be frozen in the portions of the liquid which cohere or bind the sheet particles together, so that in such event all solubles or edible particles will be frozen in or between the congealed particles.

This results in the production of a block of ice of uniform texture and density in which any solutes or edible products which may have been contained in the liquid are distributed uniformly throughout the block. The block so formed is then released from the liquid containing or mold tank in any suitable manner, as by removing one of the walls of the tank, cleaving the blocks along the line of the freezing chamber and then removing the block halves after which the apparatus is then primed and set into operation for the production of another block. As these block producing operations may be rapidly performed, blocks of any commercial size may be made at a lower cost than by prior methods. Fig. 2 shows the manner in which the solutes or edible particles are frozen into successive ice sheets, while Fig. 3 shows the manner in which each freezing plate is outwardly deformed and the manner in which an ice sheet is separated therefore and fractionated.

In the form of the apparatus shown in Fig. 4, which is designed for the formation of two cakes or blocks of ice at a time, the tank 1a is provided with a central freezing chamber 4a and freezing chambers 4b arranged on opposite sides thereof, the chamber 4a having a pair of freezing plates 6a facing the chambers 4b and the chambers 4b each having a single freezing plate 6b facing the adjacent side of the chamber 4a, said chambers being spaced from each other and the freezing plates being relatively arranged to form the intervening tapered liquid containing and mold chambers 1b. Each chamber 1b is thus provided with freezing plates at opposite sides thereof which simultaneously operate to form ice sheets which are fractionated in the manner above described to form two ice cakes or blocks, one in each chamber 1b. The tapered blocks when formed are adapted to be released from the chambers on removal of one of the walls of the tank, for example the bottom wall.

In the form of the apparatus shown in Fig. 5 the tank 1c is provided with a central liquid containing space or mold chamber 1d on opposite sides of which are arranged freezing chambers 4c having freezing plates 6c facing the chamber 1d. This apparatus is designed for the formation of a single large ice block or cake and the plates 6c which are normally flat, are divergently inclined toward the bottom of the tank to give a corresponding tapered formation to the chamber 1c. The chambers 4c are like the chambers 4, 4a, 4b, pressure chambers containing a fluid or liquid operated to increase or reduce the pressure in the chamber to cause deformation of the plates 6c. In the operation of this form of the apparatus, to form and fractionate the ice sheets, which is the same as that applying to the apparatus shown in Fig. 1, a large sized block of tapered form is produced which when formed may be released in entirety from the mold on removing the bottom wall of the tank.

Fig. 6 shows a construction in which the tank 1e is provided with freezing chambers 4e arranged opposite each other and spaced to provide a liquid or mold chamber 1f for the production of a single large cake or block of ice formed in the same manner as with the construction shown in Fig. 5. The freezing plates 6e in Fig. 6, however, are preferably normally flat or plane plates which are deformed by bowing them inwardly or toward the freezing chambers. The are arranged in downwardly diverging relationship to form a tapered mold chamber through the bottom of which the formed cake may be discharged. At the top of the mold chamber may be arranged a plunger 12 to limit the upward movement of the ice sheet fragments in the liquid, and which, when the ice cake is formed, may be used as a pusher to force the cake downward and out of the mold.

Figure 7 shows a manner of uniting a plurality of small or relatively thin composite ice cakes or blocks formed according to my invention into a unitary large block. As shown, the small blocks A2, supercooled below the freezing point of pure water, are placed side by side in a receptacle in spaced relation sufficiently to receive between them, and, if desired, about them, a wetting liquid such as substantially pure water having a freezing point higher than the temperature of the cakes, and then by suitable means, as by means of press plungers B, pressing the relatively thin cakes together and holding them in such position until the liquid with which the surfaces are wetted has congealed and cohered the several sheets or cakes into a solid block A3, as shown in Fig. 8.

By means of my process blocks having opposite concaved surfaces may be formed so that in stacking the blocks in cold storage the areas of abutting surfaces of blocks liable to freeze together may be reduced to facilitate separation of the blocks. Two such blocks A4 are shown in Fig. 9 having opposed concaved abutting surfaces $a^4$ and restricted contact portions $a^5$. When two blocks so formed are placed with opposed concaved sides thereof facing each other the area of their abutting portions is reduced as compared with ordinary blocks, so that if the abutting portions do freeze together their ready and easy separation may be quickly effected.

It will be seen from the foregoing that my invention consists, as shown in one or the other of the variant forms of the invention disclosed, in liquid containers having arranged therein one or more refrigerating and pressure regulating chambers each having one or more flexible walls for the formation thereon of an ice sheet or sheets from the liquid in the container, each refrigerating and pressure regulating chamber being provided with refrigerating means for cooling said wall or walls to an ice forming degree and each refrigerating and pressure regulating chamber containing a fluid or gas for pressurizing or vacuumizing the chamber at desired intervals to vary the pressure therein with respect to that in the liquid container, whereby, through variations in the respective pressures, the flexible wall or walls may be deformed to free the formed ice sheet or sheets therefrom and break said sheet and sheets into fragments, so that the fragments produced by successive sheet forming actions of the character described may be collected and caused to cohere, as the liquid is gradually congealed, to rapidly transform the liquid into ice sheets and into a resultant ice cake of any desired size for use. Also it will be seen that this method of deforming the refrigerated walls by elastic pressure, produced either by the fluid in the refrigerating chamber or by the liquid in the liquid container, through pressure exchange action, according to whether the pressure in the refrigerating chamber is increased or reduced for a pressurizing or vacuumizing deforming action, is highly advantageous over the use of any mechanical means for deforming the flexible walls, not only in reducing wear and tear on such walls but in enabling a uniform pressure on the walls to be obtained for a more reliable and efficient deforming and fractionating action. My construction of apparatus and method employed makes it possible to maintain fairly constant evaporator pressure, thus increasing the efficiency of the apparatus, and to secure economy in the use of the refrigerating medium and resultant economy in the manufacture of the ice. My method and apparatus also permits of the rapid production of one or more ice cakes, of any size, at a time, and the production of frozen beverage and food products containing solutes or edible substances which are evenly distributed in the frozen product so that a uniform product may at all times be obtained. In addition to the fact that the ice cakes or blocks produced may be of any desired shape or size, within reasonable limits, it is to be seen that the ice fragments produced from each ice sheet are in the form of numerous irregular fragments, which vary in size, but the majority of which have two plane surfaces, so that such fragments may be readily and quickly matted and united by congealed portions of the liquid into solid form. The solutes contained in the liquid to be frozen may be in the nature of or include a temperature depressant, and may include a bacterocidal or preservative agent, and may comprise or include other substances having flavoring, chemical, medicinal or other values allowing various kinds of frozen products to be produced. When the sheets are successively frozen the included solubles, temperature depressant or other auxiliary ingredient in the liquid will, as before stated, be unevenly distributed throughout the successively formed sheets, but when all the liquid is frozen and the sheet fragments cohered into a block, the solute or other auxiliary ingredient or ingredients will be evenly distributed in planes substantially parallel with opposite surfaces of the block. It will be evident that by my apparatus and process all the liquid in the liquid containing space of the liquid tank, which is arranged between opposed deformable refrigerating surfaces constituting therewith a block mold, may be completely frozen to form a solid block of a shape and size conforming with that of the mold, and that such a construction and arrangement of parts allows a block to be rapidly formed.

The words "freezable liquid" in the claims includes $H_2O$, comestible liquids, $H_2O$ containing solid edible substances, and beverages all in frozen condition.

From the foregoing description, taken in connection with the drawings, the construction and advantages of my improved apparatus for and method of making ice blocks will be readily understood and appreciated without a further and extended description, and it will be apparent that while I have exemplification showing certain means for carrying the invention into practical effect, other means for the purpose may conceivably be employed. Hence I reserve the right of employing such changes as fairly fall within the spirit of the invention and scope of the appended claims.

Having thus described my invention, I claim:
1. That process of quick freezing an ice block within a container which consists in locating within said container having fluid-tight walls, a fluid-tight chamber containing therein refrigerating coil means and a pressure fluid and having a flexible deformable wall lying against the refrigerating coil means, filling said container with a freezable liquid to a point where the liquid therein substantially covers said deformable wall, introducing a refrigerating medium through said coil means while permitting a portion of said liquid to freeze and form an ice layer on said deformable wall as it lies in heat exchange contact with said refrigerating coil means, forcing said pressure fluid into said chamber against the inside of said deformable wall until said wall expands and the ice sheet thereon fractionates and the ice fragments float to the top of the freezable liquid, removing pressure from said wall until it assumes its original position in heat exchange relation with said coil means, permitting the formation of a fresh layer of ice on said deformable wall and again forcing said pressure fluid into said chamber and against said deformable wall until fractionation again occurs, and continuing the operation until the ice fragments in said container adhere to each other and assist in freezing the remainder of the liquid to form a block of ice in said container.

2. That process of quick freezing an ice block within a container which consists in locating within said container having fluid-tight walls, a fluid-tight chamber containing therein refrigerating coil means and a pressure fluid and having oppositely located flexible walls lying against the refrigerating coil means, filling said container with a freezable liquid to a point where the liquid therein substantially covers said flexible walls, introducing a refrigerating medium through said coil means while permitting a portion of said liquid to freeze and form an ice layer on said flexible walls as they lie in heat exchange contact with said refrigerating coil means, forcing said pressure fluid into said chamber against the inside of said flexible walls until said walls expand and the ice sheet thereon fractionates and the ice fragments float to the top of the freezable liquid, removing pressure from said walls until they assume their original position in heat exchange relation with said coil means, permitting the formation of a fresh layer of ice on said flexible walls and again forcing said pressure fluid into said chamber and against said flexible walls until fractionation again occurs, and continuing the operation until the ice fragments in said container adhere to each other and assist in freezing the remainder of the liquid to form a block of ice in said container.

3. That process of quick freezing an ice block within a container which consists in locating within said container having fluid-tight walls, a plurality of fluid-tight chambers having substantially parallel walls each containing therein refrigerating coil means and a pressure fluid and having oppositely located flexible walls lying against the refrigerating coil means, filling said container with a freezable liquid to a point where the liquid therein substantially covers said flexible walls, introducing a refrigerating medium through said coil means while permitting a portion of said liquid to freeze and form an ice layer on said flexible walls as they lie in heat exchange contact with said refrigerating coil means, forcing said pressure fluid into said chambers against the inside of said flexible walls until said walls expand and the ice sheet thereon fractionates and the ice fragments float to the top of the freezable liquid, removing pressure from said walls until they assume their original position in heat exchange relation with said coil means, permitting the formation of a fresh layer of ice on said flexible walls and again forcing said pressure fluid into said chamber and against said flexible walls until fractionation again occurs, and continuing the operation until the ice fragments in said container adhere to each other and assist in freezing the remainder of the liquid to form a block of ice in said container.

4. That process of quick freezing an ice block within a container which consists in locating within said container having fluid-tight walls, a plurality of fluid-tight chambers having substantially parallel walls each containing therein refrigerating coil means and a pressure fluid and having oppositely located flexible walls lying against the refrigerating coil means with the juxtaposed walls of each chamber being inclined to each other, filling said container with a freezable liquid to a point where the liquid therein substantially covers said flexible walls, introducing a refrigerating medium through said coil means while permitting a portion of said liquid to freeze and form an ice layer on said flexible walls as they lie in heat exchange contact with said refrigerating coil means, forcing said pressure fluid into said chambers against the inside of said flexible walls until said walls expand and the ice sheet thereon fractionates and the ice fragments float to the top of the freezable liquid, removing pressure from said walls until they assume their original position in heat exchange relation with said coil means, permitting the formation of a fresh layer of ice on said flexible walls and again forcing said pressure fluid into and against said flexible walls until fractionation again occurs, and continuing the operation until the ice fragments in said container adhere to each other and assist in freezing the remainder of the liquid to form a block of ice in said container.

5. In an ice making apparatus, a liquid-tight container, a fluid-tight chamber mounted in said container having at least one flexible deformable wall, a refrigerating coil means within said chamber and against which said flexible deformable wall normally lies in heat exchange relationship, said chamber being located at a point in said container whereby said deformable wall may be covered by a freezable liquid within said container, means for filling said container with a freezable liquid to a point where the liquid covers said deformable wall, and means for introducing a refrigerating medium through said coil means while the same is in contact with said deformable wall, means for forcing a pressure fluid into said chamber whereby to cause said wall to expand and fractionate the ice layer on said deformable wall, and means for removing pressure from said deformable wall until it assumes its original position and heat exchange relation with said coil means whereby to permit the formation of a fresh layer of ice on said deformable wall, whereby said deformable wall may again be deformed to continue the fractionation operation.

6. In an ice making appaartus, a liquid-tight container, a plurality of fluid-tight chambers mounted in said container having flexible deformable walls, a refrigerating coil means within said chambers and against which said flexible deformable walls normally lie in heat exchange relationship, said chambers being located at a point in said container whereby said deformable walls may be covered by a freezable liquid within said container, means for filling said container with a freezable liquid to a point where the liquid covers said deformable walls, and means for introducing a refrigerating medium through said coil means while the same is in contact with said deformable walls, means for forcing a pressure fluid into said chambers whereby to cause said walls to expand and fractionate the ice layer on said deformable walls, and means for removing pressure from said deformable walls until they assume their original position and heat exchange relation with said coil means whereby to permit the formation of a fresh layer of ice on said deformable walls, whereby said deformable walls may again be deformed to continue the fractionation operation.

7. In an ice making apparatus, a liquid-tight container, a plurality of fluid-tight chambers mounted in said container having parallel flexible deformable walls, a refrigerating coil means within said chambers and against which said flexible deformable walls normally lie in heat exchange relationship, said chambers being located at a point in said container whereby said deformable walls may be covered by a freezable liquid within said container, means for filling said container with a freezable liquid to a point where the liquid covers said deformable walls, and means for introducing a refrigerating medium through said coil means while the same is in contact with said deformable walls, means for forcing a pressure fluid into said chambers whereby to cause said walls to expand and fractionate the ice layer on said deformable walls, and means for removing pressure from said deformable walls until they assume their original position and heat exchange relation with said coil means whereby to permit the formation of a fresh layer of ice on said deformable walls, whereby said deformable walls may again be deformed to continue the fractionation operation.

8. In an ice making apparatus, a liquid-tight container, a plurality of fluid-tight chambers mounted in said container each having parallel flexible deformable walls forming an angle with each other, a refrigerating coil means within said chambers and against which said flexible deformable walls normally lie in heat exchange relationship, said chambers being located at a point in said container whereby said deformable walls may be covered by a freezable liquid within said container, means for filling said container with a freezable liquid to a point where the liquid covers said deformable walls, and means for introducing a refrigerating medium through said coil means while the same is in contact with said deformable walls, means for forcing a pressure fluid into said chambers whereby to cause said walls to expand and fractionate the ice layer on said deformable walls, and means for removing pressure from said deformable walls until they assume their original position and heat exchange relation with said coil means whereby to permit the formation of a fresh layer of ice on said deformable walls, whereby said deformable walls may again be deformed to continue the fractionation operation.

References Cited in the file of this patent

UNITED STATES PATENTS

| Number | Name | Date |
|---|---|---|
| 1,482,227 | Field | Jan. 29, 1924 |
| 1,910,009 | Grayson | May 23, 1933 |
| 2,013,896 | Pennington | Sept. 10, 1935 |
| 2,398,781 | Frandsen | Apr. 23, 1946 |
| 2,471,655 | Rundell | May 31, 1949 |
| 2,521,358 | Galvin | Sept. 15, 1950 |
| 2,546,092 | Field | Mar. 20, 1951 |
| 2,613,511 | Walsh | Oct. 14, 1952 |